H. A. CUMFER.
PACKING MACHINE.
APPLICATION FILED JAN. 28, 1915. RENEWED MAY 4, 1916.
1,187,716.
Patented June 20, 1916.
8 SHEETS—SHEET 1.
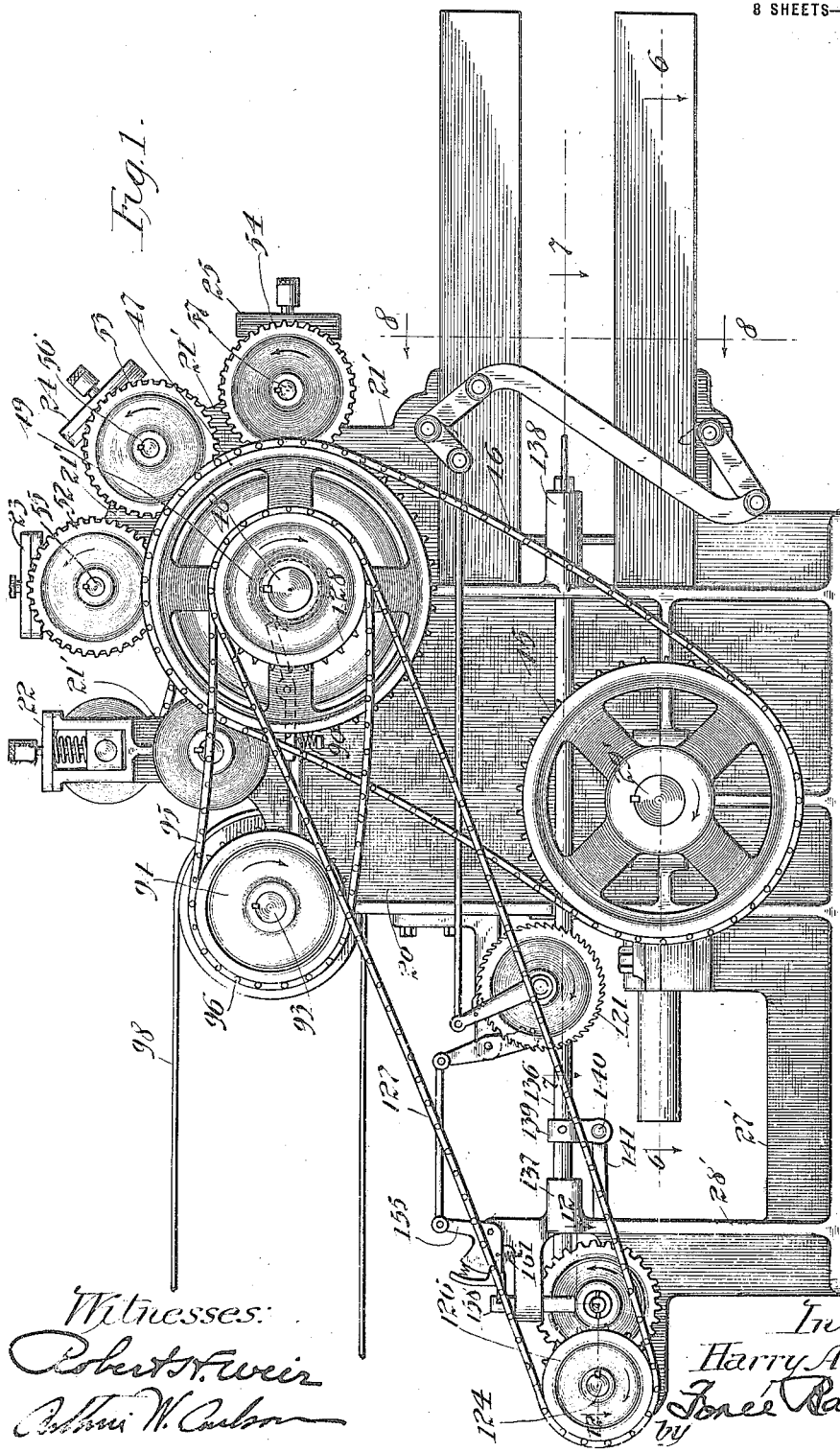

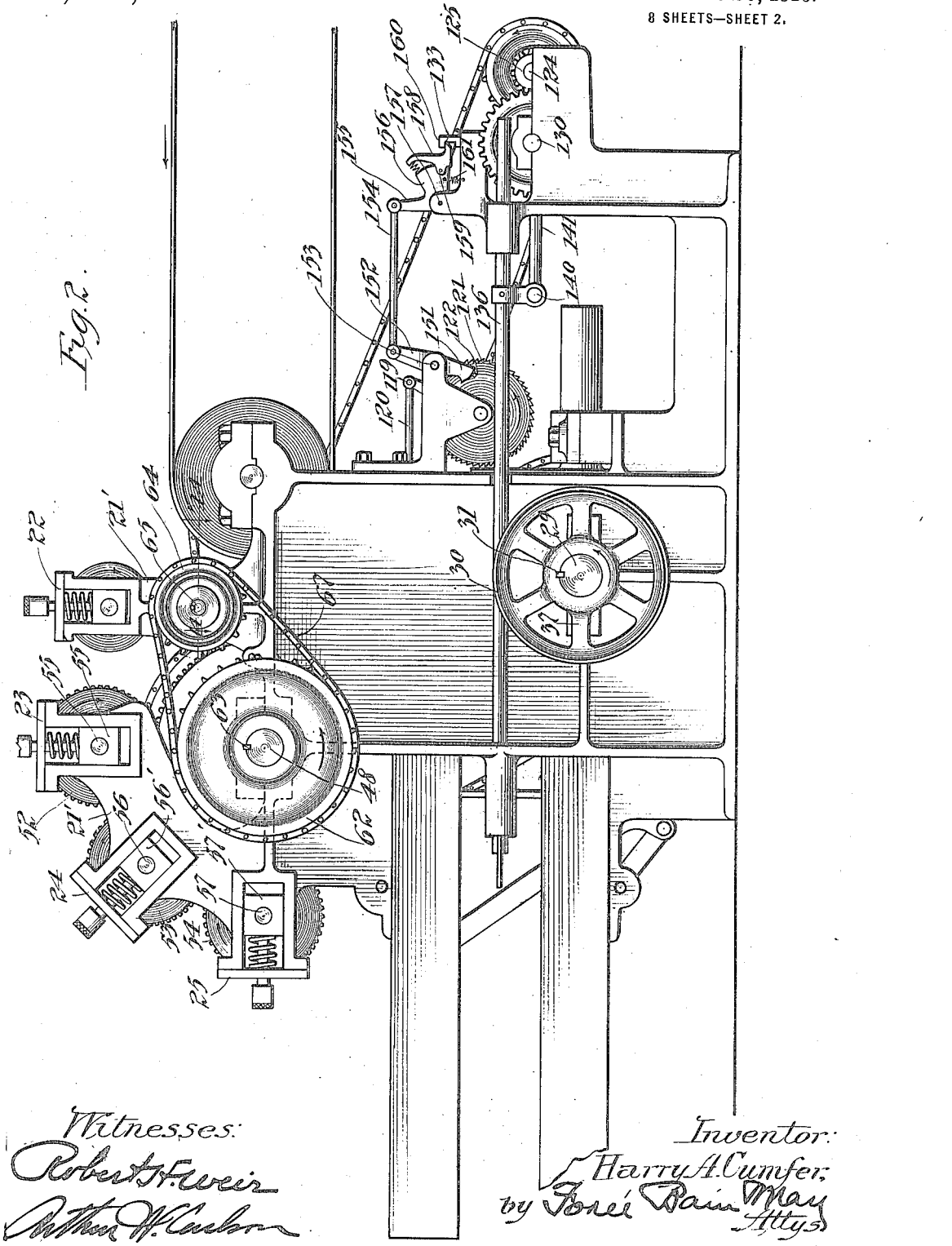

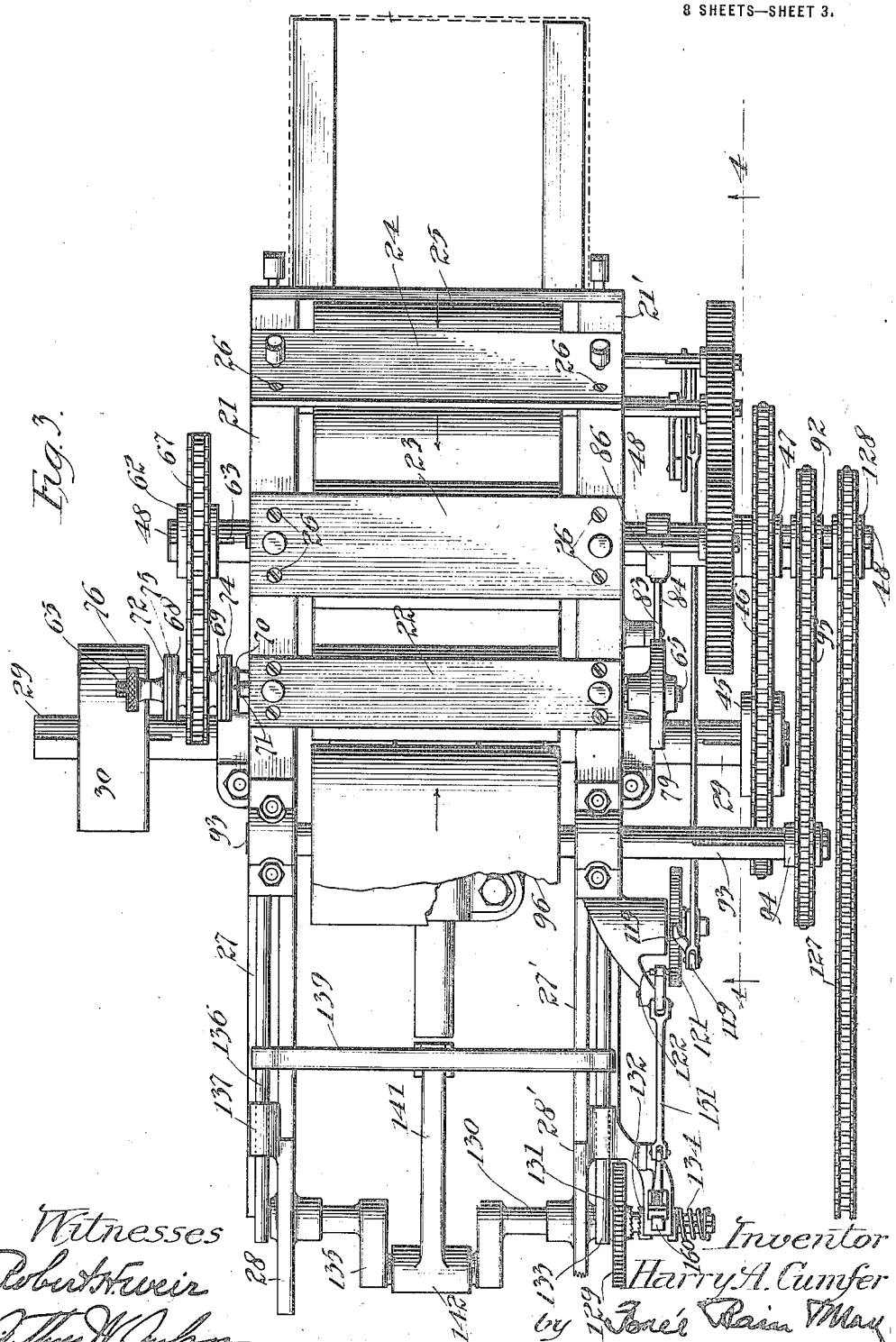

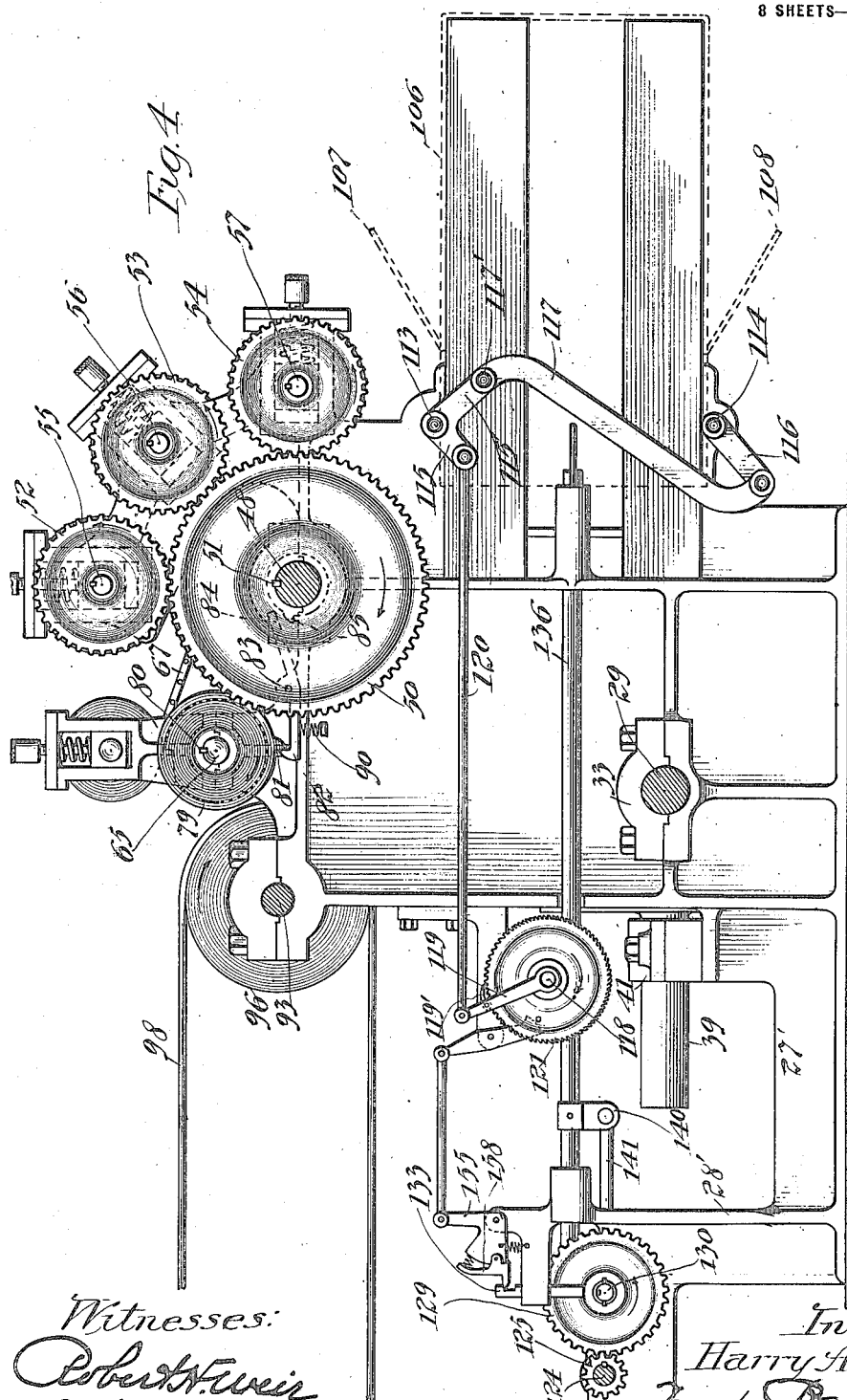

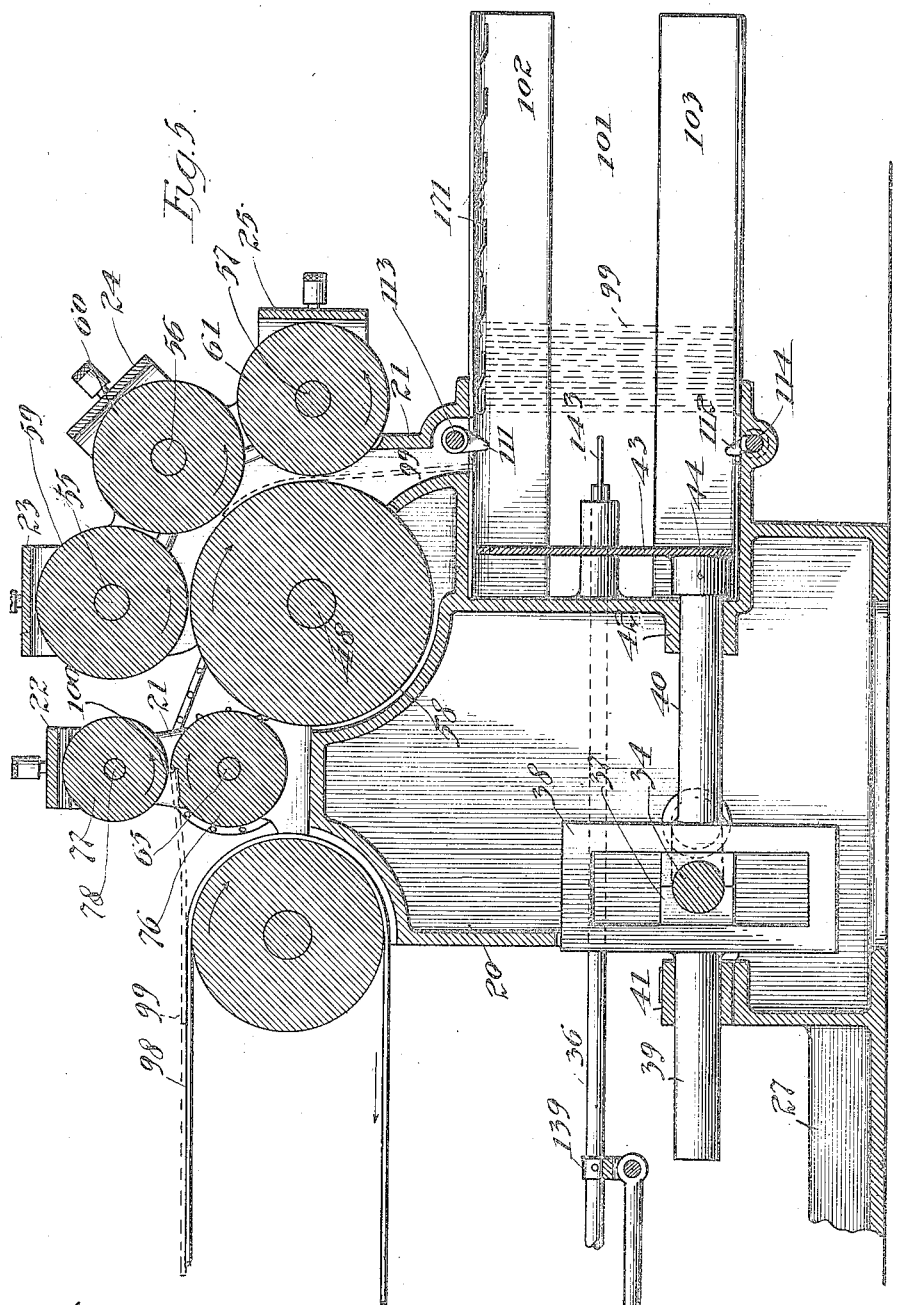

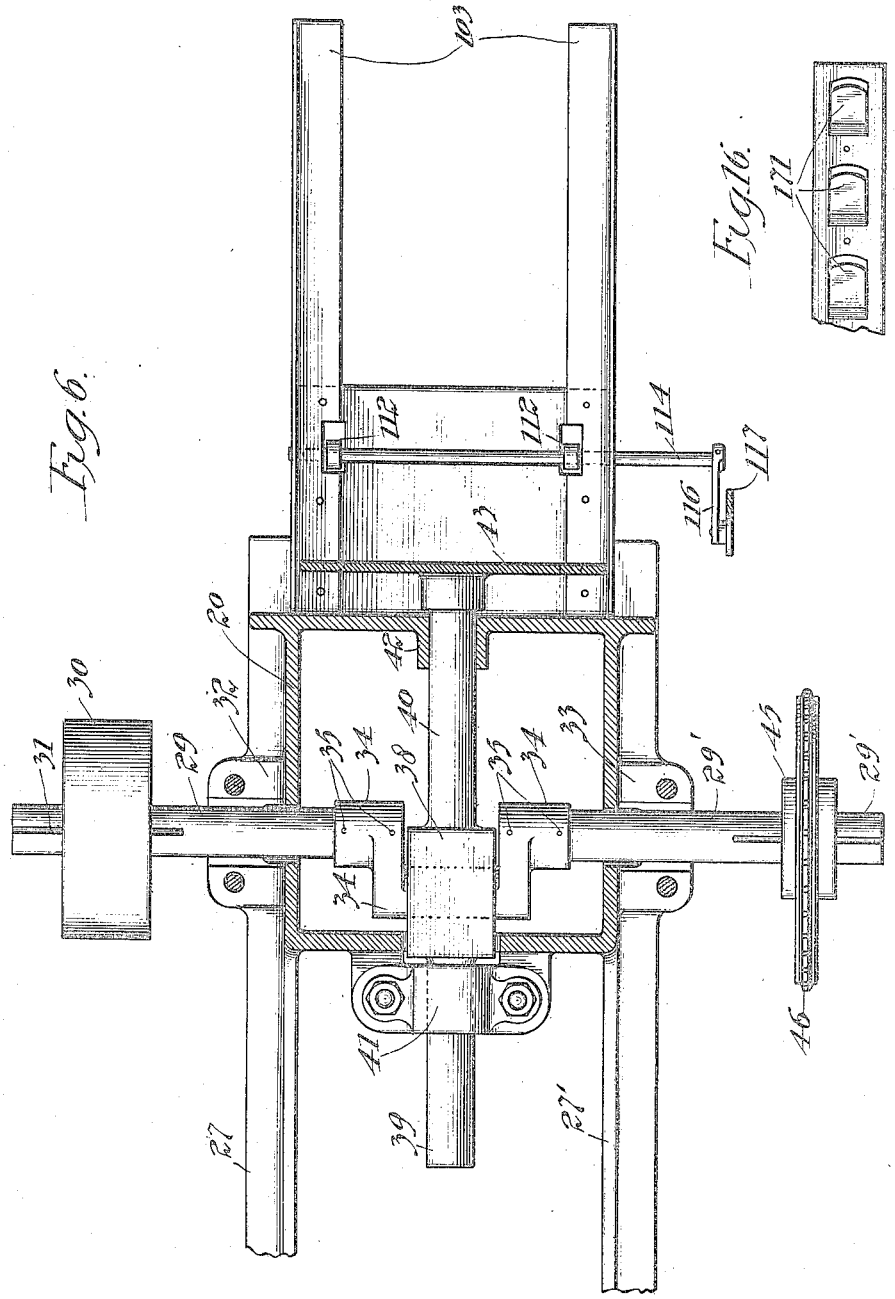

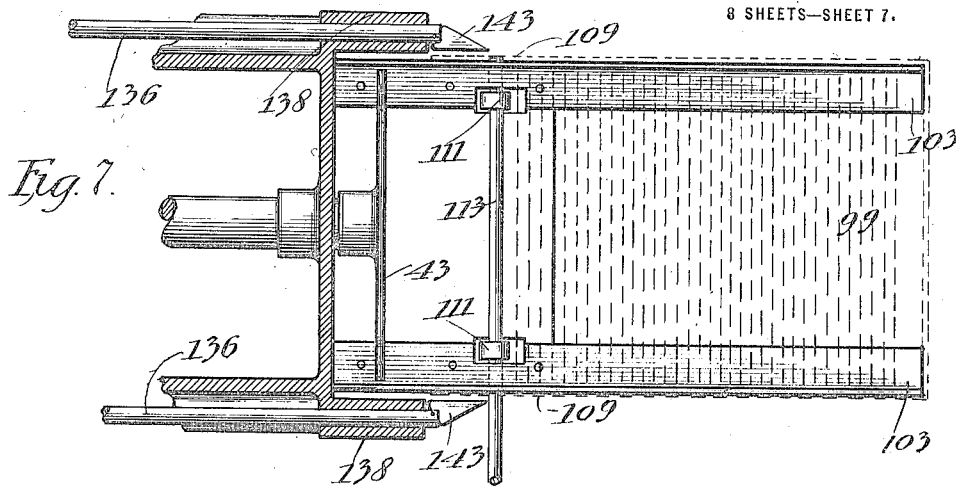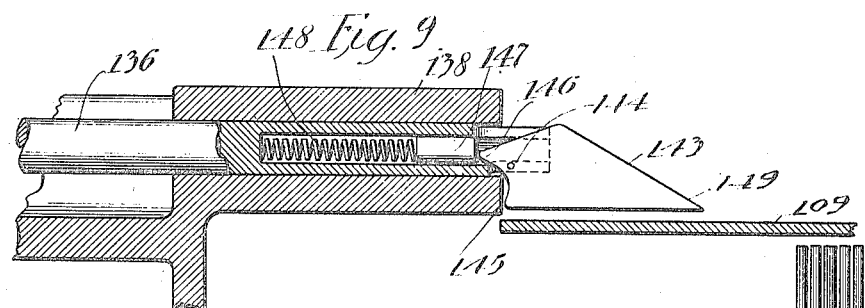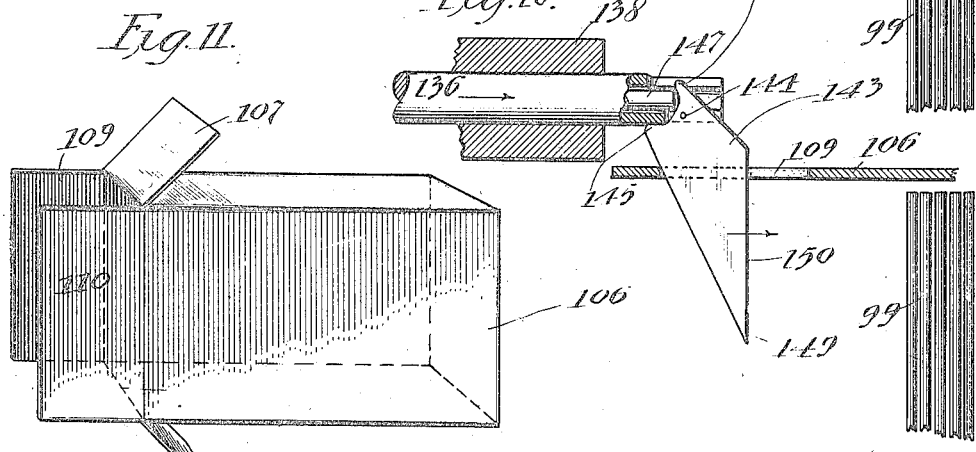

H. A. CUMFER.
PACKING MACHINE.
APPLICATION FILED JAN. 28, 1915. RENEWED MAY 4, 1916.
1,187,716.
Patented June 20, 1916.
8 SHEETS—SHEET 8.
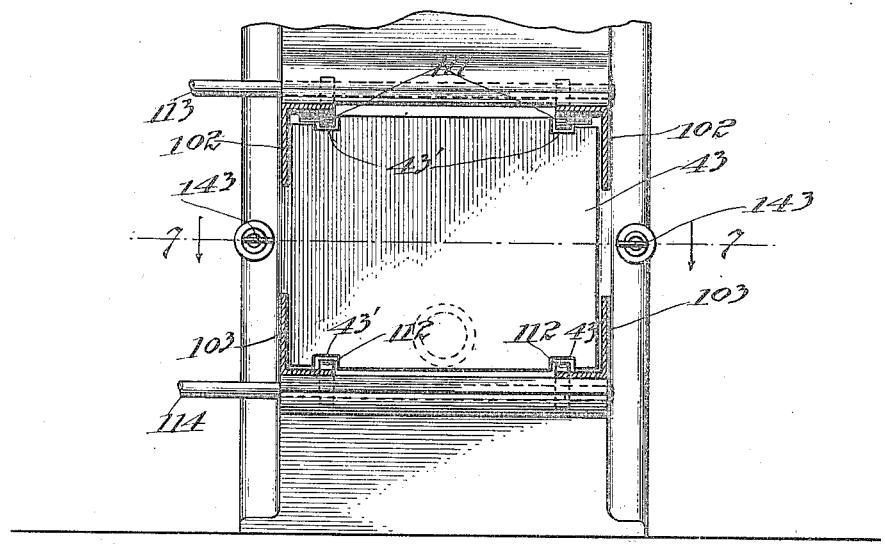
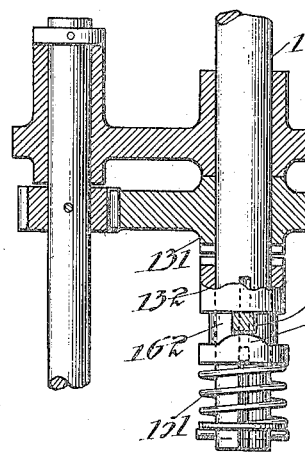
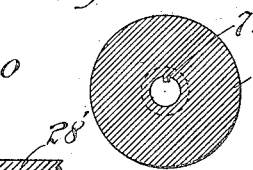
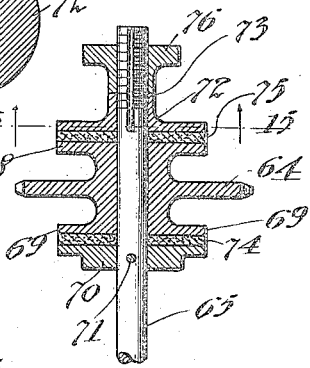
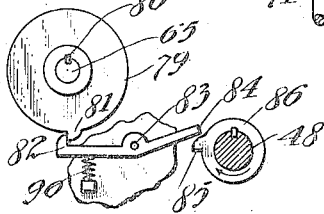
Witnesses:
Robert H. Weir
Arthur H. Auburn
Inventor:
Harry A. Cumfer
by Foree Bain May
Attys

UNITED STATES PATENT OFFICE.

HARRY A. CUMFER, OF CHICAGO, ILLINOIS.

PACKING-MACHINE.

1,187,716.　　　　Specification of Letters Patent.　　Patented June 20, 1916.

Application filed January 28, 1915, Serial No. 4,931. Renewed May 4, 1916. Serial No. 95,497.

*To all whom it may concern:*

Be it known that I, HARRY A. CUMFER, a citizen of the United States, residing at Chicago, in the county of Cook and State of Illinois, have invented certain new and useful Improvements in Packing-Machines, of which the following is a specification.

My invention relates to packing machines, and has especial reference to machines of this character adapted for packing asphalt shingles, or the like, in cartons.

One of the objects of my invention is to provide a machine which will receive shingles, or other similar plates or articles; deposit them in cartons or receptacles, and after a predetermined number of such articles have been placed within a carton, move the carton out of its shingle-receiving position to make room for another carton to take its place.

Other, further and more specific objects of my invention will become readily apparent, to persons skilled in the art, from a consideration of the following description when taken in conjunction with the drawings, wherein—

Figure 1 is a side elevation of one side of the machine. Fig. 2 is a side elevation of the opposite side of the machine. Fig. 3 is a plan view of the machine. Fig. 4 is a longitudinal section taken on line 4—4 of Fig. 3. Fig. 5 is a central longitudinal section of the rear portion of the machine. Fig. 6 is a section taken on line 6—6 of Fig. 1. Fig. 7 is a section taken on line 7—7 of Fig. 8. Fig. 8 is a section taken on line 8—8 of Fig. 1. Fig. 9 is an enlarged longitudinal section of one of the carton pushers or removers, before it is placed in operative position. Fig. 10 is a similar view showing the device extended or in operative position. Fig. 11 is a perspective view of a carton container. Fig. 12 is an enlarged section taken on line 12—12 of Fig. 1. Fig. 13 shows parts of the ejector or pusher releasing mechanism. Fig. 14 is a section taken on line 14—14 of Fig. 2, showing the friction driving coupling for the receiving rollers. Fig. 15 is a section taken on line 15—15 of Fig. 14. Fig. 16 is a detail of the shingle vertically supporting detent strip.

In all the views the same reference characters are employed to indicate similar parts.

The mechanism of my machine is mounted upon a one-part box-like frame 20, having vertically, upward-extending members 21—21'. The vertical extending side members 21—21' are held together by transversely extending plates 22, 23, 24 and 25 secured to the respective members by screws 26. Base ribs 27—27' extend forwardly of the box frame 20 and terminate in vertically extending members or standards 28—28'. A main drive shaft 29 is provided with a driving belt pulley 30, secured thereto as by a key 31 and is also provided with bearings 32 and 33 in the box frame 20. The drive shaft 29 is divided into two parts or sections 29 and 29' connected by means of an intermediate crank 34. The sections 29—29' of the main drive shaft, enter sockets 34' made in the respective ends of the crank and secured therein, as by means of pins 35. The wrist pin 34, of the crank, has bearings in a split box 37 that is vertically slidable in a scotch yoke 38. The scotch yoke 38 is intermediate of two sections 39 and 40 of a shaft which is reciprocated fore and aft by the scotch yoke and the rotation of the main drive shaft 29. The shaft 39—40 has bearings in bearing boxes 41 and 42, respectively, so that the compound shaft 39—40 will be reciprocated in a horizontal plane at each revolution of the main drive shaft 29. To the rear end of the shaft 39—40 is secured a plunger or pusher 43, as by pins 44. The object and use of this pusher will be hereinafter more fully described.

To the end 29' of the main shaft 29 is secured a sprocket wheel 45, which is connected by sprocket chain 26 to a sprocket wheel 47 that is secured on the shaft 48, as by a key 49. As the wheels 45 and 47 are about of the same diameter the shafts 29 and 48 will rotate at substantially the same speed.

The shaft 48 carries a gear wheel 50, secured thereto by means of a key 51. Geared pinions 52, 53, 54 mesh with the gear wheel 50 and are rotated thereby in the direction shown by the arrows and are designed to rotate the shafts 55, 56 and 57, respectively. The shaft 48 carries a central drum 58, in substantial contact with which are the smaller drums 59, 60 and 61 secured to shafts 55, 56 and 57 respectively. The latter smaller drums are held yieldingly in contact with the larger central drum by means of spring pressed bearing blocks 55', 56' and 57'. On the end of the shaft 48 opposite to that upon which the sprocket wheel 47 is located, is another sprocket wheel 62, secured thereto, as by means of a key 63. This sprocket wheel 62 is in driving connection with a sprocket wheel 64 that is located upon the shaft 65, by means of a sprocket chain 67. The sprocket wheel 62 drives the shaft 65 by a variable, frictional coupling association therewith effected by the mechanism shown in Figs. 14 and 15. The sprocket wheel 64 has the ends of its hub expanded, as at 68 and 69, so that their flat faces are substantially the same diameter as the fixed collar 70 that is secured to the shaft 65 by the pin 71. A disk 72 is slidable upon the shaft 65 but is rotatably connected therewith by means of a feather 73. Between the disk ends 68 and 69 of the hub for the wheel 63, and the respective disks 70 and 72, are disks of friction producing material 74 and 75, respectively. A screw set nut 76 has threaded connection with the shaft 65 and is adapted to vary the pressure between the disk 72 and the fixed disk 70, thereby to vary the frictional resistance to the rotation, of the sprocket wheel 64. The key 73 does not extend sufficiently far on the shaft 65 to be under the nut 76 and thereby prevent the nut from being turned, but it is sufficient to make positive rotatable driving association of the disk 72 with the shaft 65. Any undue resistance imposed upon the shaft 65 will cause the sprocket wheel 64 to turn idly between the friction disks 74 and 75, upon the shaft 65 without rotating the shaft. The shaft 65 carries a shingle receiving drum 76. A spring pressed coöperating drum 77 is carried upon the shaft 78 and makes yielding contact with the surface of the drum 76. Upon the opposite end of the shaft 65 is a disk 79 secured thereto as by a key 80. Projecting from the periphery of said disk is a radial lug 81 which is normally in contact with the latch lever 82, that prevents the shaft 65 from being rotated by the friction driving coupling. The latch lever is pivoted, as at 83, and is provided with an extended end 84 that overlies a similar radial projection 85, secured to a collar 86, and which is rotatively carried by the shaft 48. When the latch lever 82 engages the projection 81, of the disk 79, the shaft 65 is thus held against rotation, while the sprocket wheel 64 is permitted to rotate upon the shaft 65 against the frictional resistance exerted by the frictional disks 74 and 75, that are pressed together by the adjustable set nut 76, so that while the shaft 48 rotates constantly, the shafts 65 and 78 rotate only when permitted to do so by movement of the latch lever 81. When the projection 85 of the collar 86, on the shaft 48 passes under the extended end 84 of the latch lever, it depresses the end 82, against the resilient resistance of the spring 90, thereby releasing the disk 79 and permitting the shaft 65 to make one revolution after the projection 85 has passed from under the end 84 of the latch lever the spring 90 will return the end 82 to its normal position to catch the projection 81 upon the disk 79 and prevent the shaft 65 from further rotating.

The shaft 48 is provided with another sprocket wheel 92 and a belt conveyer shaft 93 is provided with a similar sprocket wheel 94, the latter shaft being driven by the former through the instrumentality of these wheels and the sprocket chain 95. The conveyer shaft 93 carries a drum or pulley 96 by means of which the conveyer belt 98 is driven. The shingles 99, shown in dotted lines on the conveyer 98 in Fig. 5, are fed to the receiving drum 76 on this conveyer. The drum 76 is provided with an axially extending notch upon its peripheral surface that provides the shoulder 100 against which the forward ends of the shingles abut when fed toward the drum 76 by the conveyer.

When the shaft 48 has made one revolution, the shaft 65 will be released, in the manner heretofore described, the shingle that at the time is then abutting against the shoulder 100 of the drum 76 will be fed, by the rapid revolution or movement of the shaft 65 between the drums 76 and 77, thence between the central drum 58 and the drum 59 to the drum 60 and finally between the drum 58 and the drum 61, into the dotted line vertical position in the chute 101 as shown in Fig. 5. After the shingle leaves the drum 61 it drops in a vertical direction into the chute 101 provided by the four angle bars 102, of which there is a pair, and angle bars 103, of which there is another pair, thereby forming a receptacle into which the shingles are received, and a means for holding the enveloping carton or receptacle in place. A carton 106 is placed over the chute, provided by the angle bars 102, 103, within which to receive the shingles. The carton has two of its side flaps 107, 108 turned back, while the flaps 109 and 110 are turned forwardly for engagement of the carton ejecting means, or pusher to be hereafter described.

When the shingles 99 fall into the chute 101 they are pushed successively into the carton 106 by means of a pusher 43 which is operated in the following manner:— Each revolution of the shaft 29 reciprocates the pusher 43 and pushes the shingle that has just fallen, into the chute 101, toward the carton, beyond the oscillatable dogs 111 and 112, which project into the path of the shingle within the chute, from the shafts 113 and 114, respectively. Secured to the shaft 113 is a bell crank 115, and secured to the shaft 114 is an arm 116. A link 117 connects the arm 116 with the end 115' of the bell crank 115, as at 117'. Upon a stud 118 is an oscillatable ratchet lever 119 which is connected to the shorter arm of the bell crank 115 by a link 120. Freely rotatable upon the stud 118 is a ratchet disk or wheel 121, which carries as many teeth upon its periphery as the number of shingles required to be deposited in each of the cartons, or any multiple of said number, and projecting from one side of said disk is a pin 122, or as many pins as there are multiples of the number of shingles to be deposited in the carton. Each time a shingle is deposited in the chute 101 the pusher 43 is carried forward, by the crank 34 and scotch yoke 38 and the edges of the shingle engage the dogs 111, 112 respectively, causing the bell crank lever 115 to be oscillated one impulse by each shingle. The dogs 112 are connected to the bell crank lever, as heretofore explained, through the arm 116 and the link 117. Each time the dogs 111 and 112 are rotatively displaced, by the movement of a shingle, the link 120 is oscillated by the bell crank 115 thus moving the pivoted ratchet lever 119 a distance of one tooth on the ratchet disk 121.

In the embodiment from which the drawings were made the ratchet disk 121 carries 130 teeth and therefore 130 shingles will be deposited in the carton before the carton will be ejected from its position, by means now to be described:—A shaft 124 is journaled on the standards 28 and 28' and carries a geared pinion 125. On the outer end of the shaft 124 is a sprocket wheel 126 driven by sprocket chain 127 from a similar sprocket wheel 128, upon the shaft 48. The pinion 125 meshes with the gear wheel 129 that normally turns idly upon a crank shaft 130. The gear wheel 129 carries a clutch member 131 upon one side of its hub and a corresponding clutch member 132, rotatively associated with the crank shaft 130, is normally held out of engagement with the clutch member 31, by a cam and pin 133. When the pin 133 is raised the spring 134 will press the clutch member 132 into contact with the coacting clutch member 133 and the clutch member 132 and the shaft 30 will then be rotated by the pulley 129 causing the crank 135 to make one revolution. Parallel, reciprocatable rods 136, of which there are two, one on each side of the machine, are supported in bearings 137, 138. The rods, 136, are connected together by a cross bar 139, and pivotally connected to the cross bar 139, as at 140, is a connecting rod 141, one end of which surrounds the crank, or wrist pin of the crank 135, as at 142, so that every time the crank 135 is rotated the parallel rods 136—136 will be moved forward one excursion and returned to their normal position. Carried on the end of each of the rods 136 is a spear 143, pivoted thereto, as at 144, and having a shoulder 145 that normally bears against the end of the bearing 138 and another shoulder 146 which enters the interior of the split end of the hollow rod 136, and bears against the plunger 147, which is pressed outwardly by an open helical spring 148.

When the rods 136—136 are in retracted positions, as shown in the drawings, due to the position of the crank 135, the shoulder 145 rests against the end of the bearing 138 and brings the point 149, of the spear 143, out of the path of the flap 109 of the carton 106, but when the rod 136 is pushed forward by the crank, the pressure of the plunger 147 on the end 146 of the spear, turns the point 149 toward the flap 109 and causes it to enter the flap and pass therethrough, as shown in Fig. 10. The plunger 147, pressing upon the shoulder 146, moves the spear 143 into position shown in Fig. 10 when the surface 150, of the spear, will press against the contained shingles 99 and thus push the carton out of the way and off of the underlying chute.

The carton ejector, just described, is operated in the following manner:—After the ratchet wheel 121 has been rotated, in the manner heretofore described, and the required number of shingles deposited in the carton, corresponding with the number of teeth in said ratchet wheel, the pin 122, projecting from one side of said ratchet wheel will come in contact with the tapered end 151, of the lever 152, and move it outwardly upon its pivot 153. This lever is connected by a link 154 to an arm 155 of the bell crank 156 that is pivoted as at 157. The other arm of the bell crank 156, carries a spring pressed latch 158, pivoted to said arm, as at 159, and which normally underlies a shoulder 160 provided on the upper end of the vertical pin 133. A spring 161, yieldingly holds the latch in this normal position, but when the lower end, 151 of the arm 152 is pressed outwardly, by the pin 122, the pin 133 is, by the connecting mechanism raised from its normal position in the laterally slidable clutch member 132, which is rotatively fixed to the shaft 130 and which carries a cam way 162 within which the lower end of the pin 133 normally rests. A lateral projection 163 forming the cam referred to, when it engages the lower end of the pin 133 causes the clutch 132 to move axially and outwardly against the resistance of the spring 134 and to become free from the coacting clutch member 131 on the gear wheel 129, thereby preventing further rotation of the shaft 130, by the gear 129. When the pin 133 is lifted, by the operation of the lever 153 and the pin 12, on the ratchet wheel 121, in the manner heretofore described, the shaft 130 will be permitted to make one revolution and the crank 135 will thereby cause the rods 136—136 to move forward when the spears 143 carried by the end of each of the rods will engage the flaps 109—110 respectively, of the carton, and push the carton out of the way, or off of the angle irons 102, 103, whereupon the operator will place another empty carton in place of the discharged one and the filling operation will be continued as heretofore described. It will be observed that the pusher 43 has places cut away, as at 43'—43', to clear the dogs 111, 112 so that when the pusher 43 moves forward, if a shingle is not in the path of the dogs, the apparatus will not register and the ratchet wheel 121 will not be moved one notch advanced as in no case will the dogs 111, 112 be operated by the pusher 43 without the presence of a shingle and therefore a false count can not be made in filling the cartons.

The conveyer 98 may communicate with the shingle making machine such as disclosed in my United States Patent No. 1,107,762 granted August 18th, 1914 so that the shingles will be conveyed from said machine to the packer and be arranged in a carton or retainer by the packing machine, without the necessity of manual handling and each carton will contain the precise number predetermined by the number of teeth in the ratchet wheel 121 or the multiple thereof and each carton will be promptly ejected from the machine as soon as the predetermined number of shingles have been deposited therein.

When the shingles 99 fall into the chute 101, in the manner heretofore described, and have been pushed forward by the pusher 43 they are liable to fall backward against the pusher 43, or to follow it in its retracted path when it is withdrawn and I therefore provide spring detents 171, which will permit the upper ends of the shingles to pass freely forward but will prevent them from falling rearwardly after they have been moved forward by the pusher. After the cartons 106 have been filled and ejected from the machine, in the manner heretofore described, it is only necessary to fold the flaps 107 to 110 inclusive over the end and secure them in place when the package is ready for shipment.

While I have herein shown and described a single embodiment of my machine, for the purpose of clear disclosure, it is manifest that a number of changes, in the general formation and disposition of the parts, may be made within the scope and intendment of the appended claims.

Having described my invention, what I claim is:—

1. A machine of the character described comprising a conveyer, for conveying shingles in a horizontal path; means to deflect the shingles into a substantially vertical path means, comprising a pusher, for moving said shingles while in vertical position into a receptacle, and means projecting into said receptacle for maintaining the shingles in a vertical position during packing.

2. A machine of the character described comprising a conveyer, for conveying shingles in a horizontal path; means to deflect the shingles into a substantially vertical path; means for retaining said shingles in vertical position, and means, comprising a pusher, for moving said shingles while in vertical position into a detachable receptacle.

3. A machine of the character described comprising a conveyer, for conveying shingles in a horizontal path; means to deflect the shingles into a substantially vertical path; means for retaining said shingles in vertical position; means, comprising a pusher, for moving said shingles while in vertical position into a detachable receptacle, and a receptacle holder within which said shingles are moved.

4. A machine of the character described comprising a conveyer for conveying shingles in a horizontal path; means to deflect the shingles into a substantially vertical path; means for retaining said shingles in vertical position; means, comprising a pusher, for moving said shingles while in vertical position into a detachable receptacle, a receptacle holder within which said shingles are moved, and means for automatically removing said receptacle from said holder when a predetermined number of shingles have been deposited therein.

5. A machine of the character described comprising a conveyer for conveying shingles in a horizontal path; means to deflect the shingles into a substantially vertical path; means for retaining said shingles in vertical position; means, comprising a pusher, for moving said shingles while in vertical position into a detachable receptacle; a receptacle holder within which said shingles are moved; means, operated by the shingle in its movement, for determining the number of shingles to be deposited in said receptacle and means for automatically removing said receptacle from said holder when a predetermined number of shingles have been deposited therein.

6. A machine of the character described comprising a continuously movable, belt conveyer; a pair of timed rollers to receive the shingles and intermittently feed them to continuously moving deflecting rollers; a chute, into which said shingles are consecutively deposited in vertical position and over which a shingle receiving receptacle is to be placed; a pusher for intermittently moving the shingles into said receptacle as they are deposited in the chute; means, operated by movement of the shingles to predetermine the number thereof to be deposited within the receptacle and means, to automatically push the filled receptacle from its holder when the receptacle contains the desired number of shingles.

7. In a machine of the character described comprising a continuously movable belt conveyer; a pair of timed, relatively high speed, shingle-receiving, intermittently-feeding rollers; friction means for driving said rollers; means to restrain movement of said friction driving means while said rollers are receiving a shingle; means to release said friction driving means at periodic intervals; conveying means, to receive shingles from said rollers and to feed them into a chute; a chute over which a shingle receptacle is to be placed, to receive the shingles; a shingle receptacle, having folding flaps at one end; a pusher, to push shingles, one at a time along said chute and into said overlying receptacle and a pair of co-extensively movable pushers adapted to engage flaps, on opposite sides of said receptacle, to push it, when filled, from said chute.

8. A machine of the character described comprising a continuously movable belt conveyer; a pair of timed, relatively high speed shingle-receiving intermittently-feeding rollers; friction means for driving said rollers; means to restrain movement of said friction driving means while said rollers are receiving a shingle; means to release said friction driving means, at periodic intervals; conveying means to receive shingles from said rollers and to feed them into a chute; a chute over which a shingle receptacle is to be placed, to receive the shingles; a shingle receptacle, adapted to overlie said chute; a pusher, to push shingles, one at a time, along said chute and into said overlying receptacle; a ratchet means, operated by each shingle as it is moved in said chute; a pair of coöperatively movable pushers adapted to engage said receptacle to push it, when filled, from said chute, and means, operated by said ratchet means at a predetermined time, to release said receptacle pushers, and means to move said receptacle pushers and to return them to their normal positions.

9. A machine of the character described comprising a conveyer, for conveying shingles in a horizontal path; means to deflect the shingles into a substantially vertical path means for moving said shingles while in vertical positions into bunches, and means operated by the movement of the shingles to predetermine the number in each bunch.

10. A machine of the character described comprising a conveyer, for conveying shingles in a horizontal path; means to deflect the shingles into a substantially vertical path; means, comprising a pusher, for moving said shingles consecutively into bunches containing a predetermined number of shingles, and means operated by the movement of a predetermined number of shingles to separate each bunch from the subsequently moved shingles.

11. In a machine for packaging shingles, the combination of a chute into which the shingles are consecutively deposited in vertical position and over which a shingle receiving receptacle is to be placed; a pusher for intermittently moving the shingles into said receptacle as they are deposited in the chute; means, operated by the movement of the shingles to predetermine the number thereof to be packaged within the receptacle and means, to automatically push the filled receptacle from its holder when the same contains the desired number of shingles.

12. A packaging machine comprising a carton receiving frame, means for inserting articles within said carton and means responsive to the packaging of the predetermined number of articles for ejecting said carton with its contents from the frame.

13. A shingle packaging machine comprising an open ended frame, means for stacking shingles within said frame, and means responsive to the packaging of a predetermined number of shingles and engaging the last packed shingle for ejecting the packaged shingles from the frame.

14. A shingle packaging machine comprising an open ended frame adapted to telescopically engage a removable shingle receiving carton, means for stacking shingles within said frame, ejecting means adapted on the actuation thereof to pierce opposite walls of the carton and engage the last packed shingle for ejectment of the carton with its stack of shingles, and means responsive to the stacking of a predetermined number of shingles for actuation of the ejecting means.

In testimony whereof I hereunto set my hand in the presence of two subscribing witnesses.

HARRY A. CUMFER.

In the presence of—
STANLEY W. COOK,
MARY F. ALLEN.